UNITED STATES PATENT OFFICE.

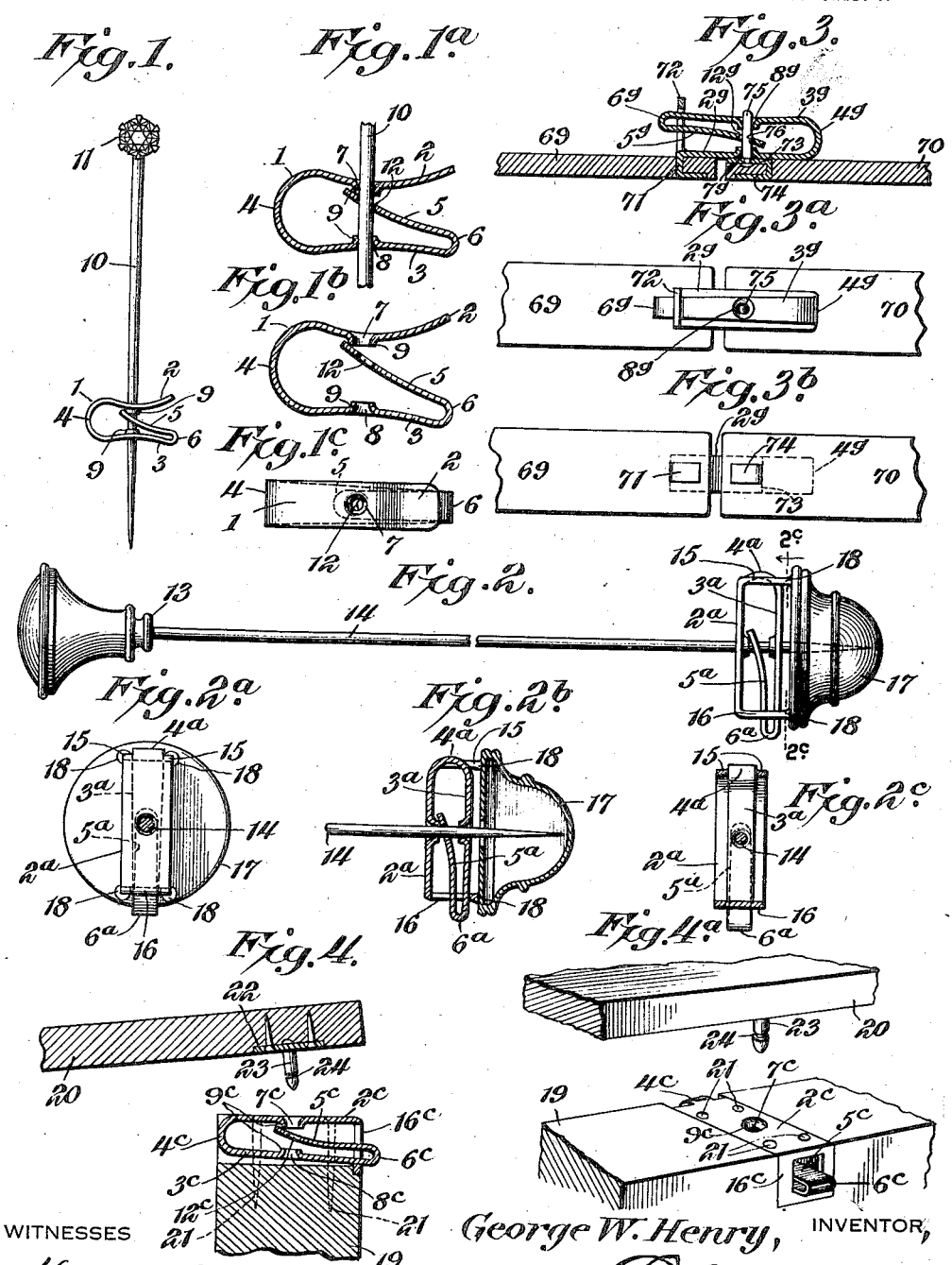

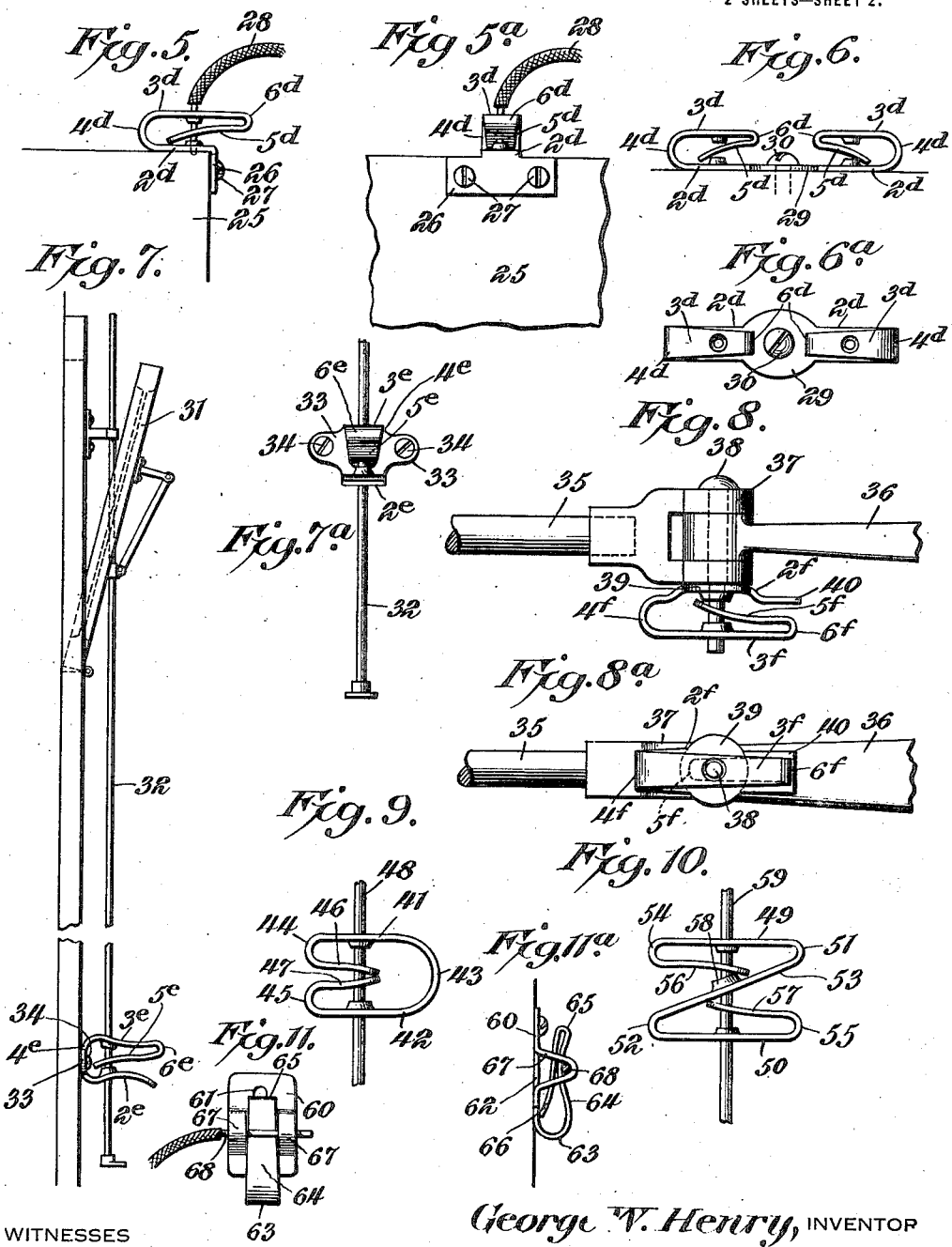

GEORGE W. HENRY, OF GLENDALE, NEW YORK, ASSIGNOR OF ONE-HALF TO EDGAR BOISSIER, OF GREAT NECK, NEW YORK.

SAFETY CLASP OR CATCH.

1,152,892.

Specification of Letters Patent. Patented Sept. 7, 1915.

Application filed June 8, 1914. Serial No. 843,756.

*To all whom it may concern:*

Be it known that I, GEORGE W. HENRY, a citizen of the United States, residing at Glendale, in the county of Queens and State of New York, have invented a new and useful Safety Clasp or Catch, of which the following is a specification.

This invention has reference to improvements in safety clasps or catches, and its object is to provide a simple and readily manipulated device for application to, and the securing of various articles.

The improved safety clasp or catch is particularly applicable to scarf and hat pins, cuff buttons, coats, shoes, and many other articles, and is also capable of providing a substitute for latches, cotter pins, and other devices where security is demanded, but release may be effected easily and quickly, and without resort to tools.

The present invention is preferably composed of a single piece of sheet metal which may be stamped out and shaped by a suitable press, so as to be produced in great numbers at minimum cost.

The device in its most usual form comprises a strip of metal folded and refolded upon itself with the refold between the other parts, and through the folded article are perforations which in the inactive position of the device are out of line, but which are readily placed into line one with the other by a compressive force tending to approach opposite parts of the device, in which case the intermediate portion is always compressed to bring the perforations in line. On the insertion of a pin or other like member through the perforations, a release of the device, which has an elastic tendency to expand causes an interbinding of the walls of the perforations upon the inserted device. This binding is in most instances ample to prevent any accidental displacement of the device upon the article to which it is applied, or of the article with respect to the device when the latter is fixed to some structure, but where additional security is demanded the article to which the device of the present invention is applied, or which is applied to the article of the present invention, may be notched or otherwise formed to lock to the device in a manner preventing displacement by any force short of a destructive force.

In general the device of the present invention is in the form of a metallic strip of more or less spring metal bent upon itself into U form with one leg provided with a return extension in the form of a tongue entering between the legs of the U toward the yoke end thereof, and having a normal spring tendency to move into engagement with the shorter leg. Through the two legs of the U-shaped clasp are formed matching perforations each with a flange thereabout, while the tongue near its free end has a plain perforation normally out of line with the other perforations, but movable into line therewith on the application of a force tending to approach the legs of the body of the device.

The invention will be best understood from a consideration of the following detailed description, taken in connection with the accompanying drawings forming a part of this specification, with the further understanding that while the drawings show practical forms of the invention, the latter is not confined to any strict conformity with the showing of the drawings, but may be changed and modified so long as such changes and modifications mark no material departure from the salient features of the invention.

In the drawings:—Figure 1 is a side elevation of the improved clasp or catch as applied to a scarf pin. Fig. 1ª is a longitudinal section on a larger scale than Fig. 1 showing the device applied to the pin. Fig. 1ᵇ is a view similar to Fig. 1ª but with the device in the inactive or extended position. Fig. 1ᶜ is a plan view of the device as seen in Fig. 1. Fig. 2 is a side view of the device as applied to a hat pin. Fig. 2ª is a rear face view of the device in the form shown in Fig. 2, the hat pin shank being shown in cross section. Fig. 2ᵇ is a longitudinal section of the point receiving member shown in Fig. 2. Fig. 2ᶜ is a section on the line 2ᶜ—2ᶜ of Fig. 2. Fig. 3 is a longitudinal section of the device adapted for fastening two ends of a belt or strap together. Fig. 3ᵃ is a plan view of the structure of Fig. 3. Fig. 3ᵇ is a rear face view of the structure of Fig. 3. Fig. 4 is a cross section of a box or other receptacle with the device of the present invention applied thereto as a latch. Fig. 4ᵃ is a perspective view of the structure of Fig. 4. Fig. 5 is an elevation showing an adaptation of the present invention as a binding post. Fig. 5ᵃ is a view of the structure of Fig. 5 as seen from the right hand side. Fig. 6 is a view of an adaptation of the structure of Fig. 5 as a multiple binding post or connector. Fig. 6ᵃ is a plan view of the structure of Fig. 6. Fig. 7 is an elevation of the structure of the present invention as applied to a transom rod. Fig. 7ᵃ is an end view of the structure of Fig. 7 as seen from the right hand side thereof. Fig. 8 is a side view of the device of the present invention as adapted for use as a cotter pin. Fig. 8ᵃ is an end view of the structure of Fig. 8. Fig. 9 is a view of a modification. Fig. 10 is a view of another modification of the invention. Fig. 11 is a view of an adaptation of the invention as a binding post for electric conductors. Fig. 11ᵃ is a side view of the structure of Fig. 11.

The general principles of the present invention will be best understood from the showing of Figs. 1ᵃ, 1ᵇ and 1ᶜ, which may be taken as illustrative of an independent structure such as shown in Fig. 1 for use as a clip for securing a scarf pin or other similar structure against loss.

The improved clasp or catch comprises a single strip 1 of metal bent primarily into U-shape and comprising legs 2 and 3 joined together at one end by a yoke 4, while one of the legs, say the leg 3, has a continuation 5 returned upon itself by way of a bend 6 to constitute a tongue. In the particular form of the device shown in Fig. 1 and associated figures the legs 2 and 3 are outwardly curved to a slight degree, so as to present convex surfaces one toward the other, and the tongue 5 is also slightly curved lengthwise and in the normal position of the parts bears with its free end against the leg 2, although it is not obligatory that the tongue should actually touch the leg 2. Through the legs 2 and 3 about midway of the length of each are perforations 7, 8, respectively, each punched inwardly so as to form an interior flange or bur 9 presented one toward the other. These perforations are in substantial alinement and are large enough to permit the passage through them of a pin or other rod-like structure, and in the particular structure of Fig. 1 and associated figures the pin is assumed to be the shank portion 10 of a scarf pin 11 which may be as indicative of any suitable pin-like structure. Produced through the tongue 5 near its free end is a perforation 12 which, however, may be a plain perforation also of a size to readily permit the passage of the pin 9. The perforation 12 is so placed with respect to the perforations 7 and 8 that when the structure is in the ordinary inactive position, in which case the legs 2 and 3 are at their widest separation, the perforation 12 is out of alinement to a small degree with the perforations 7 and 8, this being due to the normal tendency of the tongue 5 to move away from the leg 3. When, however, pressure is applied to the free end of the leg 2 and the curved connection 6 at the corresponding end of the leg 3 to cause an approach of the two legs, the free end of the tongue 5 moves toward the yoke portion 4 of the clasp or catch, and the parts are so proportioned that before the outer ends of the two legs are brought into engagement the perforations 7, 8 and 12 are in alinement, whereupon the pin 10 may be passed through these perforations, or the device may be applied to the pin. The pressure causing the approach of the legs 2 and 3 being maintained, the device may be moved to any desired position along the pin 10 and when the pressure is relieved the elastic tendency of the device causes the legs 2 and 3 to separate and the free end of the tongue 5 to move away from the yoke 4, this movement continuing until the tongue 5 at the margins of the perforation 12 clamps against the side of the pin 10 and forces the latter into side engagement with the corresponding walls of the perforations 7 and 8. This produces a very effective three-point grip or clamp which holds very tenaciously to even so smooth a device as the pin 10 and no force which is ordinarily exerted upon the device when applied to the pin 10 is sufficient to move it lengthwise for a distance to escape from the pin 10. The device therefore constitutes a very effective safety clasp or catch for such articles as scarf or necktie pins holding them against escape from the scarf or necktie to which they are applied.

To remove the device from the scarf pin it is simply necessary to pinch the legs 2 and 3 toward each other until the perforation 12 is in alinement with the perforations 7 and 8, whereupon the device may be readily removed from the scarf pin.

In order to regulate and equalize the elasticity of the structure the leg 3 and its continuation or tongue 5 are made gradually tapering from the yoke 4 toward the free end of the tongue, so that the tongue is in effect more elastic than either leg 2 or 3 and the leg 3 is more elastic than the leg 2.

While this is not so essential in some forms of the invention, it is quite essential in other forms.

The perforations 7 and 8 serve to weaken the corresponding legs 2 and 3, but this is counteracted by the stiffening action of the burs or flanges 9 surrounding the perforations 7 and 8 on the inner faces of the respective legs.

In Fig. 2 and associated figures the structure is in most particulars similar to that shown with respect to Fig. 1 and associated figures, but the structure is somewhat changed to adapt it to the particular use intended. In Fig. 2 there is shown a hat pin 13 provided with a shank 14. The catch or clasp is in general similar to the one shown in Fig. 1 and associated figures, except that the legs are straight instead of being curved away from each other, and the same letters of reference are applied to similar parts except that in Fig. 2 and associated figures each reference letter is supplied with the exponent "a."

On opposite sides of the yoke portion $4^a$ of the clasp are short fingers 15, while at the other end of the leg $2^a$ there is formed a loop 16. The fingers 15 and loop 16 are bent at substantially right angles to the leg $2^a$ toward and beyond the leg $3^a$, the leg $3^a$ in this instance being somewhat longer than the leg $2^a$, so that the return bend $6^a$ extends through the loop 16. Attached to the free ends of the fingers 15 and loop 16 is a head or receptacle 17 which may be of any ornamental configuration, and is designed to receive the point of the pin 14 to prevent injury therefrom when the clasp or catch is applied to the pin after the latter has been passed through a hat. The projection of the end $6^a$ of the leg $3^a$ forms a convenient manipulating portion in conjunction with that end of the leg $2^a$ provided with the loop 16. The fingers 15 and loop 16 may be soldered or otherwise attached to the head 17, the points of such connection being indicated at 18.

Since the fingers 15 and loop 16 are in straddling relation to the leg $3^a$, the yoke $4^a$ and the tongue $5^a$ where joining the leg $3^a$, the leg $2^a$ is made considerably wider than the leg $3^a$ to provide for the construction described.

The device is well adapted as a simple latch for box or other like covers. In Figs. 4 and $4^a$ there is shown a portion of a box 19 with its cover 20, the showing being merely fragmentary. Recessed into the appropriate edge of the front panel of the box 19 is a catch device having a leg $2^c$ terminating at one end in a loop $16^c$ bent at substantially right angles to the length of the leg $2^c$, while the other end of the leg $2^c$ terminates in a yoke $4^c$ merging into another leg $3^c$ extended through the loop $16^c$ and by a return bend $6^c$ joined to a tongue $5^c$ all similar to the arrangement shown in Fig. 2 and associated figures. The legs $2^c$ and $3^c$ have matching perforations $7^c$ and $8^c$ with inner marginal flanges $9^c$, while the tongue $5^c$ has a perforation $12^c$ all as in the other figures. The leg $2^c$ is laterally expanded for the reception of fastening devices 21 by means of which the latch structure is made fast to the front panel of the box 19 after the manner of a mortise lock. Fast to the cover 20 is a plate 22 carrying a projecting stud 23 which in the arrangement shown has a circumferential groove 24 near the free end, which end is pointed. Such a stud will readily enter through the perforation $7^c$ and pass into and through the perforation $12^c$, while the point of the pin may reach into the perforation $8^c$. On the closing of the box cover the tongue $5^c$ is pushed by the pin or stud 23 in a direction toward the leg $3^c$ until the walls of the perforation $5^c$ snap into the groove 24, thus effectively locking the cover of the box to the body thereof against any effort to open the box short of the application of a destructive force. When it is desired to open the box it is merely necessary to grasp the projecting end $6^c$ and move it toward the cover of the box, thus causing the perforated end of the tongue $5^c$ to move toward the yoke $4^c$ until the perforations are all in alinement and the walls of the perforation $12^c$ are out of engagement with the groove 24, after which the cover may be readily lifted.

In Figs. 5 and $5^a$ there is shown a fragment of a battery 25 which may be taken as indicative of the outer shell of an ordinary dry battery or the like. In this instance the device has one leg $2^d$ shorter than the other leg $3^d$, which other leg has at its free end a return bend $6^d$ from which is continued a tongue $5^d$ similar to the like structures of the other forms of the device. The two legs are joined by a yoke $4^d$ as in the other forms. The leg $2^d$ terminates in an angle extension 26 of greater lateral spread than the width of the leg $2^d$ and bent at approximately right angles thereto, so that the portion 26 may be applied to the side of the battery 25 by screws 27 or otherwise with the leg $2^d$ resting upon the upper end of the battery or upon any other surface which may be provided for its support. The terminal portion of an electric conductor 28 is readily introduced through the several perforations in the parts $2^d$, $3^d$ and $5^d$ when the leg $3^d$ is bent toward the leg $2^d$ and on the release of the leg $3^d$ its natural elastic tendency causes it to move to bring the tongue $5^d$ into locking relation to the conductor 28.

In Figs. 6 and $6^a$ the parts are in general similar to the structure of Fig. 5, wherefore those parts which agree therewith are marked with the same reference numerals as the structure of Fig. 5, but two binding posts are shown in the structure of Fig. 6 with their legs 2$^d$ joined by an integral connecting portion 29 laterally expanded and suitably perforated for the reception of a securing screw 30. The structure of Fig. 6 and Fig. 6$^a$ provides a connector for electric wires which may be employed whether or not the device be permanently fastened as by the screw 30.

In Figs. 7 there is shown a transom 31 with the usual transom rod 32, which latter is also shown in Fig. 7$^a$. Fastened to an appropriate portion of the frame of the structure provided with the transom is a clasp which may be quite similar to the structure of Fig. 1 and associated figures and comprises legs 2$^e$ and 3$^e$, a tongue 5$^e$ connected to the leg 3$^e$ by a bend 6$^e$ and the two legs are connected by a yoke portion 4$^e$, which however has opposite side ears 33 formed thereon for the passage of screws 34 by means of which the structure is secured to any permanent support. The rod 32 may be raised or lowered in the usual way and is held by the catch structure in any position of adjustment, but is readily released by pressure applied to the free ends of the legs 2$^e$ and 3$^e$ as in the other forms.

In Figs. 8 and 8$^a$ are shown two members 35, 36 connected by a joint 37 traversed by a pivot pin 38 which it may be assumed is of a character requiring ready removal, but when in place is to be held against accidental removal, the conditions being such as customarily demand the presence of a pin and more particularly the presence of a cotter pin. In this structure there are legs 2$^f$ and 3$^f$ with a tongue 5$^f$, the legs being connected by a yoke 4$^f$, all of the same general form as in Fig. 1 and associated figures. However, where the leg 2$^f$ is perforated it is laterally expanded as shown at 39, so that it may have a broad bearing against the appropriate portion of the joint 37. The leg 2$^f$ is provided with a manipulating end 40 which may be quite straight and in such relation to the bend 6$^f$ so that the extension 40 and extension 6$^f$ form convenient finger holds by means of which the structure may be applied to the pin 38 or removed therefrom as in other forms of the invention.

In Fig. 9 there is shown a U-shaped member comprising two legs 41 and 42 joined by a yoke 43 and each leg terminating at the end remote from the yoke in a return bend 44, 45, respectively. The leg 41 carries by the return bend 44 a tongue 46 and the leg 42 carries by the return bend 45 a leg 47, these legs having their free ends bent one toward the other, so that under their elastic tendency they come into engagement at the ends, being located between the legs 41 and 42. The legs 41 and 42 and the inner ends of the tongues 46 and 47 are perforated as in the other structures, so that instead of three points of contact there are four, but the clamping action is the same as before with the addition of another point of engagement due to the presence of two tongues 46 and 47 instead of a single tongue 5, as in Fig. 1 and other figures. The structure of Fig. 9 is designed to be applied to a pin, wire or rod 48 which may correspond to the pins or wires of the other figures.

In Fig. 10 there are two generally parallel legs 49 and 50 having at opposite ends return bends 51, 52, respectively, connected by an intermediate inclined portion 53. The other ends of the legs 49 and 50 have return bends 54 and 55, respectively, each continued in the form of respective tongues 56 and 57. The legs 49 and 50 are perforated in substantial alinement one with the other and the intermediate connecting member 53 is also perforated as indicated by a bur 58. The perforations through the legs 49 and 50 and the connecting member 53 may be ordinarily in line one with the other with perforations through the tongues 56 and 57 out of line therewith, but on the application of pressure in a direction to cause the legs 49 and 50 to approach all the perforations may be brought into alinement, in which case a wire 59 may be introduced to be gripped by the expansion of the catch or clasp, and in this case there are five points of grip instead of 3.

By a still further modification of the invention there may be produced a device such as shown in Figs. 11 and 11$^a$, which illustrate a convenient form of readily releasable binding post for electric conductors. There is provided a plate portion 60 which may have a perforation 61 whereby the plate is made fast to any fixed structure, and from this plate portion there is continued a leg member 62 similar to the leg 2 of Fig. 1, the leg portion 62 terminating in a yoke 63 from which there is continued a leg 64 similar to the leg 3, which leg 64 is in overriding relation to the leg 62 and terminates at its free end in a return bend 65 continued as a tongue 66 directed toward the yoke 63 between the legs 62 and 64. Formed on the plate 60 on opposite sides of the leg 62 are return fingers 67 continued from the plate 60 in a direction toward the leg 64, and then again toward the plane of the plate 60. Ordinarily, that is, when the device is inactive, the leg 64 is sprung away from the leg 62 by the spring finger 66 to a distance beyond the outer or bent parts of the fingers 67, but on the application of a suitable force to the end 65 the leg 64 is bent toward the leg 62 until its outer surface is within the bent parts of the return fingers 67, whereupon an electric conductor 68 may be passed through the bent portions of the fingers 67 outside of the leg 64, so that on the release of the latter the elastic tendency of the leg and of the tongue 66 causes a firm gripping of the conductor in the clip in good electrical contact with the parts engaged.

In Fig. 3 and associated figures there are shown two strap ends 69 and 70 to be joined together. There is also disclosed a junction member comprising two legs 2ᵍ and 3ᵍ joined by a yoke 4ᵍ. The end of the leg 2ᵍ remote from the yoke 4ᵍ is formed with an extension 71 so bent as to pass through the strap 69 at an appropriate distance from its end, and is then bent over into clamping relation to the strap. At the end 71 of the leg 2ᵍ there is also formed a loop 72 from which the extension 71 may be stamped out. The leg 3ᵍ is continued through the yoke 72 and is there formed with a return bend 6ᵍ and a tongue continuation 5ᵍ. The legs have respective perforations 7ᵍ and 8ᵍ and the tongue is provided with a perforation 12ᵍ as in other forms. The end 70 of the strap has a plate 73 applied thereto with a tongue 74 extending through and bent against the strap to lock the plate 73 thereto. Carried by the plate 73 is a pin 75 of a length to extend through the perforations or both legs 2ᵍ and 3ᵍ and also through the perforations 12ᵍ of the tongue 5ᵍ, and this pin is formed with a notch 76 into which one wall of the perforation 12ᵍ may lodge. The two strap ends 69 and 70 are readily joined by simply inserting the pin 75 first through the perforation 7ᵍ and then in succession through the perforations 12ᵍ and 8ᵍ, the tongue 5ᵍ readily yielding thereto. When, however, the wall of the perforation 12ᵍ is lodged in the notch 76, no force short of a destructive force will dislodge it except the end 6ᵍ be pressed toward the strap end 69 which will carry the wall of the perforation 12ᵍ out of the notch 76, thus releasing the pin.

The device is adapted to many other applications, but those shown will suffice to indicate the wide adaptability of the present invention to a multitude of uses, the changes necessary being largely slight changes of shape, while the general principle of the invention remains the same in all of them.

What is claimed is:—

1. A safety clasp or catch comprising an elongated strip of elastic material bent upon itself into substantially U-shape with the terminal portions of the legs thereof spaced apart, and one leg having a continuation in the form of a tongue extending between the two legs toward the yoke end and also bent away from the leg carrying it in a direction toward the other leg and into coactive relation to the latter, both legs and the tongue being perforated with the perforations out of line in the inactive position and movable into line on causing the outer ends of the legs to approach one toward the other, with the line of coincidence with the perforations substantially perpendicular to the length of the legs of the clasp.

2. A safety clasp or catch comprising an elongated strip of spring metal bent upon itself into substantially U shape with one leg provided with a continuation of its outer end in the form of a tongue returned upon the leg between said leg and the other leg toward the yoke end of the clasp with the free end of the tongue engaging the inner wall of the said other leg, and both legs and the tongue being perforated with the perforations out of line in the inactive position of the clasp and movable into line on causing the outer ends of the legs to approach, the line of coincidence of the perforations agreeing substantially in direction with the movements of the free ends of the legs toward and from each other.

3. A safety clasp or catch comprising an elongated strip of elastic material bent upon itself into substantially U-shape and having one leg prolonged in the form of a tongue close to said leg where proceeding from it and extending between the two legs toward the yoke end of the clasp and toward the leg other than the one it prolongs, both legs and the tongue being perforated with the perforations out of line in the inactive position and movable into line on causing the outer ends of the legs to approach, the line of coincidence of the perforations being substantially perpendicular to the length of the legs of the U-shaped clamp, the perforations through the legs being each bordered by a bur or flange on the inner face of the leg and the tongue being plain or free from a bur or flange.

4. A safety clamp or catch comprising an elongated strip of metal bent into substantially U shape with the outer end of one of the legs continued in the form of a tongue directed toward the yoke end of the U-shaped clamp between the two legs, the tongue and the leg carrying it tapering from the yoke end of the clamp to the free end of the tongue and both legs and the tongue having perforations therethrough normally out of alinement and movable into alinement by the approach of the free ends of the legs one toward the other, the line of coincidence of the perforations being substantially in the same direction as the movement of the free ends of the legs toward and from each other.

5. A safety clasp or catch comprising an elongated strip of metal bent upon itself into substantially U shape with one leg having a continuation of its free end in the form of a tongue returned between the two legs toward the yoke end, said tongue being longitudinally curved toward the leg remote from that from which it springs and both of the legs and the tongue being perforated with the perforations normally out of line and movable into alinement by approaching the free ends of the legs, the line of coincidence of the perforations being substantially in the same direction as the movements of the free ends of the legs toward and from each other.

6. A safety clasp or catch comprising an elongated strip of metal bent upon itself into substantially U shape with one leg having a continuation of its free end in the form of a tongue returned between the two legs toward the yoke end, said tongue being longitudinally curved toward the leg remote from that from which it springs and both of the legs and the tongue being perforated with the perforations normally out of line and movable into alinement by approaching the free ends of the legs, the line of coincidence of the perforations being substantially in the same direction as the movements of the free ends of the legs toward and from each other, the free end of the tongue having a normal tendency toward and bearing against the inner face of the leg toward which it is curved.

7. A safety clasp or catch comprising an elongated strip bent upon itself into substantially U shape with the legs curved away one from the other to present convex faces one toward the other, and the free end of one leg having a return continuation constituting a tongue directed between the two legs toward the yoke end of the clasp, and said tongue being also longitudinally curved with its free end engaging the leg other than the one from which it springs, both legs being intermediately perforated and the tongue having a perforation near its free end with the perforations normally out of line and movable into alinement on causing the free ends of the legs to approach, the line of coincidence of the perforations being in substantially the same direction as the line of movement of the free ends of the legs toward and from each other.

8. A safety clasp or catch comprising an elongated strip bent upon itself into substantially U shape with the legs curved away one from the other to present convex faces one toward the other, and the free end of one leg having a return continuation constituting a tongue directed between the two legs toward the yoke end of the clasp, and said tongue being also longitudinally curved with its free end engaging the leg other than the one from which it springs, both legs being intermediately perforated and the tongue having a perforation near its free end with the perforations normally out of line and movable into alinement on causing the free ends of the legs to approach, the line of coincidence of the perforations being in substantially the same direction as the line of movement of the free ends of the legs toward and from each other, the inner faces of the legs of the clasp being formed with burs or flanges surrounding the perforations therethrough.

9. A safety clasp or catch comprising an elongated strip bent upon itself into substantially U shape with the legs curved away one from the other to present convex faces one toward the other, and the free end of one leg having a return continuation constituting a tongue directed between the two legs toward the yoke end of the clasp, and said tongue being also longitudinally curved with its free end engaging the leg other than the one from which it springs, both legs being intermediately perforated and the tongue having a perforation near its free end with the perforations normally out of line and movable into alinement on causing the free ends of the legs to approach, the line of coincidence of the perforations being in substantially the same direction as the line of movement of the free ends of the legs toward and from each other, the inner faces of the legs of the clasp being formed with burs or flanges surrounding the perforations therethrough, and the tongue and the leg from which it springs tapering in width toward the free end of the tongue.

10. A safety clasp or catch comprising a substantially bow or U shape strip of metal with an interiorly located spring tongue tending to separate the legs of the clasp and constituting a continuation of one leg of the clasp, said last-named leg and tongue tapering in width toward the free end of the tongue, both legs and the tongue near its free end being perforated in locations to cause the perforations to be brought into alinement on the approach of the legs one toward the other, and the legs being formed with burs or flanges about the perforations with the perforation through the tongue plain.

11. A clasp or catch comprising a strip of spring metal bent upon itself into bow or U shape with the legs intermediately perforated and reinforced about the perforations, and one of said legs having a return continuation in the form of a tongue located intermediate of the legs and tending toward the other leg and perforated adjacent to its free end, the tongue and the leg from which it extends being tapered toward the free end of the tongue.

12. A clasp or catch comprising an elongated strip of elastic material bent upon itself into substantially U-shape with the terminal portions of the legs spaced apart and one leg having a prolongation in the form of a tongue extending between the two legs toward the yoke end, said tongue having its free end bent toward and into contact with the leg other than that of which it forms a prolongation, and the two legs having the ends remote from the yoke relatively movable one toward the other in opposition to the normal tendency of the tongue, said tongue and both of the legs coacting to grip and hold an article.

In testimony, that I claim the foregoing as my own, I have hereto affixed my signature in the presence of two witnesses.

GEORGE W. HENRY.

Witnesses:
HAROLD L. STRICKER,
ARTHUR G. WELSH.